(12) United States Patent
Wasserman et al.

(10) Patent No.: US 8,889,775 B2
(45) Date of Patent: Nov. 18, 2014

(54) IN-SITU METHODS OF GENERATING WATER THROUGH THE DEHYDRATION OF METAL SALT HYDRATES FOR MOISTURE CROSSLINKING OF POLYOLEFINS

(71) Applicant: Dow Global Technologies LLC, Midland, MI (US)

(72) Inventors: Eric P. Wasserman, Hopewell, NJ (US); Bharat I. Chaudhary, Princeton, NJ (US); Michael B. Biscoglio, Piscataway, NJ (US)

(73) Assignee: Dow Global Technologies LLC, Midland, MI (US)

( * ) Notice: Subject to any disclaimer, the term of this patent is extended or adjusted under 35 U.S.C. 154(b) by 3 days.

(21) Appl. No.: 13/970,900

(22) Filed: Aug. 20, 2013

(65) Prior Publication Data

US 2013/0334738 A1  Dec. 19, 2013

Related U.S. Application Data

(62) Division of application No. 12/679,539, filed as application No. PCT/US2008/076861 on Sep. 18, 2008, now Pat. No. 8,541,491.

(60) Provisional application No. 60/975,880, filed on Sep. 28, 2007.

(51) Int. Cl.
| | |
|---|---|
| *C08J 9/14* | (2006.01) |
| *C08F 8/00* | (2006.01) |
| *C08K 5/057* | (2006.01) |
| *C08K 5/57* | (2006.01) |
| *C08J 9/12* | (2006.01) |
| *C08K 5/098* | (2006.01) |

(52) U.S. Cl.
CPC . *C08F 8/00* (2013.01); *C08K 5/057* (2013.01); *C08K 5/57* (2013.01); *C08J 9/125* (2013.01); *C08K 5/098* (2013.01); *C08J 2343/04* (2013.01)
USPC ........... 524/394; 524/395; 524/396; 524/397; 524/398; 524/399; 524/400; 524/521

(58) Field of Classification Search
CPC ...... C08J 9/125; C08J 2343/04; C08K 5/057; C08K 5/098; C08K 5/57; C08F 8/00; C08L 43/04
USPC ......................................... 524/394–400, 521
See application file for complete search history.

(56) References Cited

U.S. PATENT DOCUMENTS

| | | | |
|---|---|---|---|
| 3,225,018 | A | 12/1965 | Zutty |
| 3,646,155 | A | 2/1972 | Scott |
| 4,144,202 | A | 3/1979 | Ashcraft et al. |
| 4,574,133 | A | 3/1986 | Umpleby |
| 4,594,382 | A | 6/1986 | Hoenig et al. |
| 5,246,783 | A | 9/1993 | Spenadel et al. |
| 6,025,445 | A | 2/2000 | Chiba et al. |
| 6,331,597 | B1 | 12/2001 | Drumright et al. |
| 6,420,485 | B1 | 7/2002 | Suzuki et al. |
| 6,496,629 | B2 | 12/2002 | Ma et al. |
| 6,714,707 | B2 | 3/2004 | Rossi et al. |
| 2003/0149152 | A1 | 8/2003 | Hao |
| 2007/0161758 | A1 | 7/2007 | Sultan et al. |

FOREIGN PATENT DOCUMENTS

| | | |
|---|---|---|
| EP | 1298169 | 4/2003 |
| JP | 02-185565 | 7/1990 |
| JP | 11-209639 | 8/1999 |
| WO | 2005082989 | 9/2005 |

OTHER PUBLICATIONS

International Search Report for PCT Pat. No. PCT/US2008/076861 mailed Mar. 28, 2010.

*Primary Examiner* — Peter D Mulcahy
(74) *Attorney, Agent, or Firm* — Whyte Hirschboeck Dudek S.C.

(57) ABSTRACT

Compositions comprising a polymer resin comprising at least one copolymer with hydrolysable groups, a water-generating metal salt hydrate, and a catalyst that comprises a metal atom and at least two ligands taken from the set alkyloxy and carboxylate are used to form articles that moisture-cure through in-situ generation of water via dehydration of the metal hydrate. The compositions are melt mixed to promote the dehydration and start the cure process during the mixing step. The curing compositions are formed and allowed to harden.

8 Claims, No Drawings

IN-SITU METHODS OF GENERATING WATER THROUGH THE DEHYDRATION OF METAL SALT HYDRATES FOR MOISTURE CROSSLINKING OF POLYOLEFINS

FIELD OF THE INVENTION

This invention relates to the crosslinking of resins. In one aspect, the invention relates to the crosslinking of silane-functionalized resins while in another aspect, the invention relates generally to moisture-cured resins. In yet another aspect, the invention relates more specifically to compositions and methods for in-situ generation of water to effect the moisture cure. In still another aspect, the invention relates to the manufacture of cable insulation and sheathing and other products made from such crosslinked resins.

BACKGROUND OF THE INVENTION

In the fabrication of articles such as cables, pipes, footwear, foams and the like, the polymeric compositions from which these articles are made must often be melt blended. The compositions often comprise silane-functionalized resins and a catalyst, and these resins undergo crosslinking through their silane functionalities upon exposure to moisture at either an ambient or an elevated temperature. Moisture-cured resins represent a significant portion of the market for crosslinked polyolefins in cable insulation today. They are generally restricted to articles of thin construction because the crosslinking chemistry requires the polymer to absorb moisture from the environment while below the melting point, and diffusion of water through semicrystalline, hydrophobic polymer is very slow.

Direct addition of water prior to fabrication is impractical because (a) it boils at temperatures appropriate for the extrusion of polyethylenes; (b) its solubility in polyolefins is extremely low; (c) water trapped in the polymer above the saturation point is likely to phase separate, causing defects due to voids and highly non-uniform crosslink densities. Also, large amounts of free water might cause premature crosslinking.

One key requirement in the moisture cure process is to minimize premature crosslinking of the resin during storage or during melt processing, e.g., extrusion, molding, etc.

Another important consideration in the fabrication of these articles is to achieve crosslinking within a short period of time, e.g., hours, days, after the melt processing is completed. Short cure times can be achieved by curing at elevated temperatures, e.g., in excess of 70° C., and/or through the use of powerful catalysts such as sulfonic acids. As the thickness of the fabricated article increases, so does the time that moisture takes to diffuse into and through the polymer composition, even at elevated temperatures. This adds to the cost of the fabrication process. As such, the polymer fabrication industry has a continuing interest in accelerating the moisture-cure of silane-functionalized resins.

BRIEF SUMMARY OF THE INVENTION

In one embodiment, the invention is a composition comprising: (A) a polymer resin comprising at least one copolymer with hydrolyzable groups, (B) a metal hydrate water-generating organic compound of the general formula $M_xQ_y(H_2O)_z$, wherein M is a cation of a metal selected from groups 1 through 13 of the periodic table, Q is an organic anion, x and y are integers taken to balance the overall charge of the salt, and z is the hydration number of the salt on a molar basis at 25° C.; and (C) a catalyst that comprises a metal ion and at least two anionic ligands taken from the set alkoxide and carboxylate.

In another embodiment, the invention is a process for forming a moisture-cured article, the process comprising: blending a polymer resin comprising at least one copolymer with hydrolyzable groups, a hydrated salt of the general formula $M_xQ_y(H_2O)_z$, wherein M is a cation of a metal selected from groups 1 through 13 of the periodic table, Q is an organic anion, x and y are integers taken to balance the overall charge of the salt, and z is the hydration number of the salt on a molar basis at 25° C.; and a catalyst that comprises a metal ion and at least two ligands taken from the set alkoxide and carboxylate to form a composition, wherein the blending is done at a temperature above the melting point of the resin; generating water in-situ in the composition during the blending step to form a molten curing composition; forming the molten curing composition into an article; and, allowing the molten curing composition to harden.

The invention further includes articles produced by the above process.

DETAILED DESCRIPTION OF THE INVENTION

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

"Cable", "power cable", "transmission line" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a polymeric compound prepared by polymerizing monomers, whether of the same or a different type. The generic term polymer thus embraces the term "homopolymer", usually employed to refer to polymers prepared from only one type of monomer, and the term "interpolymer" as defined below.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms means a mixture or blend of two or more components. In the context of a mix or blend of materials from which a cable sheath or other article of manufacture is fabricated, the composition includes all the components of the mix, e.g., silane-grafted polyolefin, lubricant, filler and any other additives such as cure catalysts, antioxidants, flame retardants, etc.

We have found that the addition of certain hydrates of salts containing metal ions can serve as convenient in-situ sources of water at elevated temperature. The extent of crosslinking can be regulated through the silane content of the resin and the level of water generating compound. The source of moisture does not interfere with the catalysis of the moisture crosslinking reaction. By appropriate choice of the salt, one can modify the rate of water loss at any particular temperature. For those applications in which the presence of extractable organic molecules in the polymer is a problem, this technology is superior to a chemistry which relies on the loss of water from an organic compound.

Water may be generated in-situ in the moisture curable resin by any water-generating compound of the following general formula: $M_xQ_y(H_2O)_z$, wherein M is a cation of a metal taken from groups 1 through 13 of the periodic table, Q is an organic anion and x and y are integers taken to balance the overall charge of the salt, and z is the hydration number of the salt on a molar basis at 25° C. In some embodiments, the water generating salt of an organic compound is a tartrate, citrate or acetate. In some more specific embodiments, the water generating compound is at least one of sodium L-tartrate dihydrate, sodium citrate tribasic dihydrate, or sodium acetate trihydrate. Preferably, the onset temperature of dehydration of the water generating compound is greater than 100° C. and less than about 200° C. The metal hydrate should be present in an amount sufficient to generate between about 0.1 to about 4 moles of water per mole of silane substituent.

Compared with the use of organic molecules as moisture sources, the metal salts envisaged are cheaper, less toxic, easier to handle, and generate no small molecules which could migrate out of the polymer except water. Compared with isocyanate technology, the water-induced crosslinking of polymers bearing trialkoxysilyl groups has fewer health issues. It is also more appropriate for high temperature extrusion and end-use applications.

Any copolymer with hydrolyzable groups that is to be cured in the melt or solid state and is thicker than about 2 mm would benefit from a cure technology such as this. The majority of the polymer need not be derived from ethylene or any other olefin, but could derive from cyclic esters or ethers, for example. The technology could also be useful in the fabrication of polymer foams, films, fibers, footwear, pipes, etc.

The copolymer with hydrolyzable groups is most typically a silane functional copolymer. Polymers with silane functional groups are well-known in the field. Such polymers can be made either by copolymerization of a suitable base monomer with a reactive silane compound or by one of many methods for grafting a silane-containing molecule to the backbone of a polymer chain. Typical suitable base monomers (or monomers for producing the polymer chain backbone) include, for example, one or more of styrene, ethylene, propylene, methyl methacrylate, or vinyl acetate, more typically ethylene. The reactive silane compound can be an unsaturated silane compound having one or more hydrolyzable groups. Typical reactive silane compounds include an alkenyl group such as vinyl, allyl, isopropenyl, butenyl, cyclohexenyl, or γ-(meth)acryloxy allyl, and a hydrolyzable group such as a hydrocarbyloxy, hydrocarbonyloxy or hydrocarbylamino group. Specific examples of hydrolyzable groups include methoxy, ethoxy, formyloxy, acetoxy, propionyloxy, and alkylamino or acrylamino groups. More typically, the reactive silane compound is a vinyltrialkoxysilane. A suitable reactive silane is vinyl trimethoxysilane. Examples of methods to produce polymers with silane functional groups are disclosed in U.S. Pat. Nos. 3,646,155; 6,420,485; 6,331,597; 3,225,018; and 4,574,133, all of which are incorporated herein by reference. Polymers with silane functional groups are also commercially available, for example, Si-Link™ ethylene-vinyltrimethoxysilane copolymers available from Dow Chemical Co.

In one embodiment, the copolymer with hydrolyzable groups is a copolymer of ethylene and a vinyltrialkoxysilane (wherein the alkoxy group is RO, in which R is an alkyl group of 1-8 carbon atoms), produced either through copolymerization or through radical grafting. An example of a suitable such polymer is an ethylene-vinyltrimethoxysilane copolymer. The vinylalkoxysilane content should be between about 0.1 and about 5 mole % relative to all monomers.

The moisture-cure catalyst can be any compound that promotes the silane condensation crosslinking reaction. Generally, such a catalyst comprises a metal ion and at least 2 ligands taken from the set alkoxide and carboxylate. Two or more functional groups may be found on a single ligand, as in a glycolate.

Most typically, the moisture-cure catalyst is one or more organometallic compounds or complexes of lead, cobalt, iron, nickel, zinc, titanium, aluminum, or tin, preferably tin, such as dibutyltin dilaurate or distannoxanes. Specific catalysts include, for example, dibutyltin dilaurate, dioctyltin maleate, dibutyltin diacetate, dibutyltin dioctoate, dibutyltin didodecanoate, stannous acetate, stannous octoate, lead naphthenate, zinc caprylate, titanium alkoxides, aluminum alkoxides, and cobalt naphthenate. Such catalysts are commercially available. The catalyst should be present in concentrations of between about 0.1 and about 20 mole % relative to the silane substitutent.

In some embodiments, the composition may further contain non-moisture curable polymer resins. Such resins may be incorporated as carriers for the catalyst and/or the moisture-forming compound (e.g., the masterbatch methods), as diluents, as reactants in other crosslinking reactions (e.g., free-radical crosslinking), or to provide specific physical properties to the composition (e.g., adding an elastomeric resin to provide elasticity or impact resistance). These non-moisture curable resins should be added in an amount that does not reduce the strength of the cured composition to an undesirable extent. Although the upper limit is application specific, one skilled in the art is experienced in determining such cut-off points. Generally, the amount of these resins would be less than about 40%.

The composition can contain other flame retardants and fillers including talc, calcium carbonate, organoclay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures thereof. The fillers may contain various surface coatings or treatments, such as silanes, fatty acids, and the like. Halogenated organic compounds including halogenated hydrocarbons such as chlorinated paraffin, halogenated aromatic compounds such as pentabromotoluene, decabromodiphenyl oxide, decabromodiphenyl ethane, ethylene-bis(tetrabromophthalimide), dechlorane plus, and other halogen-containing flame retardants. One skilled in the art would recognize and select the appropriate halogen agent depending on the desired performance of the composition.

The composition can further comprise various other additives. Peroxides and free-radical initiators can be added for crosslinking the resin.

In those formulations containing filler, the amount of filler present is typically between 2 and 80, preferably between 5 and 70, weight percent (wt %) based on the weight of the polymer. In a preferred embodiment of this invention in which a filler is present, the filler is coated with a material that will prevent or retard any tendency that the filler might otherwise have to interfere with the silane cure reaction. Stearic acid is illustrative of such a filler coating. Selection of filler and catalyst must be made to avoid any undesired interactions and reactions.

The composition can contain other additives such as, for example, antioxidants (e.g., hindered phenols such as, for example, IRGANOX™ 1010 a registered trademark of CibaSpecialty Chemicals), phosphites (e.g., IRGAFOS™ 168 a registered trademark of CibaSpecialty Chemicals), UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes, colorants or pigments to the extent that they do not interfere with desired physical or mechanical properties of the compositions of the present invention, and other flame retardant additives.

Compounding of the composition can be effected by standard means known to those skilled in the art. Examples of compounding equipment are internal batch mixers, such as a Banbury™ or Bolling™ internal mixer. Alternatively, continuous single or twin screw mixers can be used, such as a Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

The components are to be mixed at a temperature and for a length of time sufficient to fully homogenize the mixture but insufficient to cause the material to gel. The catalyst may be added before or after the water-generating compound. Typically, the components are mixed together in a melt-mixing device. The mixture is then shaped into the final article. The temperature of compounding and article fabrication should be above the melting point of the polymer but below about 250° C.

In some embodiments, either or both of the catalyst or the moisture-forming compound are added as a pre-mixed masterbatch. Such masterbatches are commonly formed by dispersing the compound into an inert plastic resin, such as low density polyethylene. Masterbatches are conveniently formed by melt compounding methods.

The high temperature mixing promotes dehydration of the metal hydrates, thereby releasing water in-situ in the composition. The water generated by the dehydration begins to react with the silane groups to crosslink, otherwise known as "cure," the composition. Following the high-temperature mixing, the curing composition is formed into an article and allowed to harden. The article can be formed by any suitable forming method, as known in the art. Such forming methods include extrusion, molding, rolling, rotary molding and the like. This method is especially advantageous for articles larger than about 2 mm due to decreased cure times relative to standard cure methods.

In one embodiment, the polymer composition of this invention can be applied to a cable as a sheath or insulation in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die.

The formed article may then be subjected to a further cure period, which takes place at temperatures above ambient but below the melting point of the polymer, until the article has reached the desired degree of crosslinking. In one preferred embodiment, the further cure is augmented by externally supplied water permeating into the bulk polymer from the atmosphere or from a water bath or "sauna". Generally, the further cure may take place at ambient or elevated temperature but the temperature of the cure should be above 0° C.

Other articles of manufacture that can be prepared from the polymer compositions of this invention, particularly under high pressure and/or elevated moisture conditions, include fibers, ribbons, sheets, tapes, tubes, pipes, weather-stripping, seals, gaskets, foams, footwear and bellows. These articles can be manufactured using known equipment and techniques.

The following examples further illustrate the invention. Unless otherwise stated, all parts and percentages are by weight.

EXAMPLE 1

A pelletized sample of copolymer of ethylene and vinyltrimethoxysilane (VTMS) (41.2 g) containing 1.5 wt % VTMS was added to a twin-screw mixer with setpoint of 128° C. and 25 RPM, followed 1 min later by 0.533 g sodium L-tartrate dihydrate and 4 min after that, by 0.091 g dibutyltin dilaurate (DBTDL). During the mixing process, the temperature ranged from 121-123° C. After 6 min, the mixer was stopped and the compounded material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.74 lb-in after 5 min and 0.85 lb-in after 62 min.

EXAMPLE 2

A sample of the same copolymer from Ex. 1 (41.3 g) was added to a twin-screw mixer with settings as in Ex. 1, followed 3 min later by 0.655 g sodium citrate tribasic dihydrate and 2 min after that, by 0.086 g DBTDL. During the mixing process, the temperature ranged from 121-123° C. After 5 min, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.44 lb-in after 5 min and 0.57 lb-in after 60 min.

EXAMPLE 3

A sample of the same copolymer from Ex. 1 (41.0 g) was added to a twin-screw mixer with settings as in Ex. 1, followed 2 min later by 0.228 g sodium acetate trihydrate and 3 min after that, by 0.071 g DBTDL. During the mixing process, the temperature ranged from 122-124° C. After 7 min, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.56 lb-in after 5 min and 0.65 lb-in after 60 min.

Comparative Example 1

Exclusion of Salt Hydrate

A sample of the same copolymer from Ex. 1 (41.5 g) was added to a twin-screw mixer with settings as in Ex. 1, followed 3 min later by 0.233 g DBTDL. During the mixing process, the temperature ranged from 116-123° C. After 6 min, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.40 lb-in after 5 min and 0.45 lb-in after 62 min.

These examples indicate that a combination of vinyltrimethoxysilane copolymer, a metal salt hydrate, and an organometallic catalyst induce crosslinking at 140° C.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A process for forming a moisture-cured article, the process comprising:

blending a copolymer of ethylene and a vinyltrialkoxysilane in which the alkoxy group is RO and R is an alkyl group of 1 to 8 carbon atoms, a hydrated salt of the general formula $M_xQ_y(H_2O)_z$, wherein M is a cation of a metal selected from groups 1 through 13 of the periodic table, Q is an organic anion, x and y are integers taken to balance the overall charge of the salt, and z is the hydration number of the salt on a molar basis at 25° C., the hydrated salt having an onset temperature of dehydration of greater than 100° C. and less than 200° C.; and a catalyst that comprises a metal ion and at least two ligands taken from the set alkoxide and carboxylate to form a composition, wherein the blending is done at a temperature above the melting point of the resin;

generating water in-situ in the composition during the blending step to form a molten curing composition;

forming the molten curing composition into an article; and, allowing the molten curing composition to harden.

2. The process of claim 1 wherein the cure is done at a temperature below about 250° C.

3. The process of claim 1 further comprising curing the article by exposure to external moisture after the molten curing composition has hardened.

4. The process of claim 1 wherein the article is formed by molding, extrusion, rolling or rotary molding.

5. The process of claim 1 wherein the hydrated salt is at least one of sodium L-tartrate dihydrate, sodium citrate tribasic dihydrate, or sodium acetate trihydrate.

6. An article produced by the process of claim 1.

7. The article of claim 6 wherein the article is a foam, film, fiber, footwear, pipe, cable, or wire.

8. The article of claim 6 wherein the article has a thickness of at least about 2 mm.

* * * * *